United States Patent

[11] 3,608,739

[72] Inventor Philip L. Duboff
Kearny, N.J.

[21] Appl. No. 800,057
[22] Filed Feb. 18, 1969
[45] Patented Sept. 28, 1971
[73] Assignee Shelfmaker Products Corp.
Kearny, N.J.

[54] REVOLVING STORAGE TABLE
5 Claims, 6 Drawing Figs.

[52] U.S. Cl. .......... 211/40, 108/12
[51] Int. Cl. .......... A47g 29/00
[50] Field of Search .......... 211/41, 78, 40, 131; 312/8, 11; 108/12, 28

[56] References Cited

UNITED STATES PATENTS

| | | | |
|---|---|---|---|
| 57,963 | 9/1866 | Platt | 211/41 |
| 274,087 | 3/1883 | Danner | 211/131 X |
| 689,213 | 12/1901 | Nicholson | 211/78 |
| 878,315 | 2/1908 | Samso | 211/41 |
| 1,412,664 | 4/1922 | May | 211/40 |
| 1,660,210 | 2/1928 | Schaefer | 211/41 |
| 2,157,400 | 5/1939 | Cooper | 108/28 X |
| 2,899,074 | 8/1959 | Gullixson | 211/40 |
| 2,951,593 | 9/1960 | Lake | 211/131 X |
| 3,092,256 | 6/1963 | Vernik | 211/40 |
| 3,214,029 | 10/1965 | Jack | 211/40 |

*Primary Examiner*—Nile C. Byers, Jr.
*Attorney*—Jacobi, Lilling & Siegel

ABSTRACT: A novel revolving storage table is disclosed offering single- or double-tier storage of phonograph record albums and the like, the storage table further functioning as an occasional table. The storage table generally comprises a base member having an elongated pole extending vertically upwardly thereof. First and second tray means are removably journaled for easy rotation on nylon collars or bearings disposed on the pole at a lower and upper tier or level, respectively. Each of the tray means includes record guide means on one surface thereof for vertically storing the records in a novel fashion such that the title of each record is visible to facilitate selection. The tray means disposed at the upper tier can be flipped over in a novel fashion to present a flat, smooth surface coextensive with the top of the elongated pole thus providing an occasional table.

INVENTOR
PHILIP L. DUBOFF

BY Jacobi and Davidson
ATTORNEYS

INVENTOR

PHILIP L. DUBOFF

BY Jacobi and Davidson

ATTORNEYS

REVOLVING STORAGE TABLE

BACKGROUND OF THE INVENTION

This invention generally relates to tables and particularly concerns a revolving, multitier table for the vertical storage of phonograph records, magazines, and the like.

Modern home furnishings and equipment generally include a phonograph record player or system and a substantial number of phonograph records for use therewith. Proper storage of these phonograph records is critical to ensure a long, useful record life. If the records are merely stacked flat, one upon the other, damage to the grooves of the records near the bottom of the stack may occur due to the pressing weight of the other records. Additionally, it is quite difficult to select the particular record that one would desire to play at any given time since all records of the stack must be flipped through, one at a time until the desired record is located.

In an attempt to provide proper storage of records, the prior art has developed a variety of different record stands. A common feature with all such prior art stands is that the records, in one way or another, are stored vertically on edge thus eliminating the hazard of damage to the record grooves. Yet, in those varieties of prior art record holders that merely hold bulk quantities of records in a vertical fashion between wide dividers, selection of an individual record from the bulk quantity cannot easily be effected.

An additional drawback of prior art record storage devices concerns the amount of floor space that such devices require within the home. Since the prior art record storage devices serve only a storage function, the particular floor spaced required for the record storage device is effectively lost for other living functions.

SUMMARY OF THE INVENTION

Accordingly, it is evident that a need still exists in the prior art for a record storage means which not only stores the records in a vertical fashion but which stores such records in a manner facilitating individual selection and removal thereof, and which functions to provide an additional utilization other than storage alone. It is the primary object of the instant invention to satisfy this need.

More specific yet equally important objects of the instant invention are as follows:

- to provide a record storage means which doubly functions as a convenient occasional table;
- to provide a record storage means which offers single- or double-tier record storage;
- to provide a record storage means which is characterized by a simple construction yet which is highly efficient;
- to provide a record storage means which is sturdy;
- to provide a record storage means wherein all records thereon are stored in a fashion such that the title of each record is easily visible, and,
- to provide a record storage means having a relatively low cost of construction.

These objects as well as other objects which will become apparent as the description proceeds are implemented by the instant invention which is characterized by the provision of a revolving record storage table generally comprising a lower and upper tier of trays, each tray being revolvable and alternatively functioning either to store records, or as a table surface.

A base member having a generally elongated pole extending upwardly therefrom is provided and two revolving trays are respectively journaled for rotation on the pole at an upper and lower location or tier. The particular placement of each revolving tray on the pole is constrained by the utilization of novel collar means, preferably constructed of nylon, which serve as a support bearing for the trays. Each tray preferably comprises a disc having a centrally disposed journaling bore therethrough and defining generally planar top and bottom surfaces. Of importance is the fact that ring-shaped guide means for the records to be stored are concentrically disposed on and extend generally normal to the top surface of each disc at different radial distances about the journaling bore. The ring-shaped guide means preferably comprise first and second concentric rings, each ring consisting of a plurality of spaced-apart fingers with the spaces between each adjacent finger of each respective ring defining a guide slot. Corresponding guide slots of each guide ring are radially aligned such that when the records are placed thereon, the faces of the record jackets will always be visible to the user of the novel device and, due to the rotational journaling of each tray or disc facilitated by the nylon collars, an individual record can easily be selected.

An important advantage of the instant invention from the standpoint of space utilization is the fact that at least the top or upper tier tray member can easily be removed from the upwardly extending pole and, in essence, "flipped over" in a novel fashion so as to expose the generally planar surface thereof coextensive with the top of the elongated pole. When the upper tier tray is so "flipped over," the novel inventive device serves the dual function of an occasional table comprising the upper tray, and a single-tier record storage means comprising the lower tray.

BRIEF DESCRIPTION OF THE DRAWINGS

The invention will be better understood and additional features and advantages thereof will become apparent from the following detailed description of a preferred inventive embodiment, such description referring to the appended drawings, wherein.

Like reference numerals refer to similar parts throughout the various views of the drawings.

DETAILED DESCRIPTION OF A PREFERRED INVENTIVE EMBODIMENT

Figure 1:
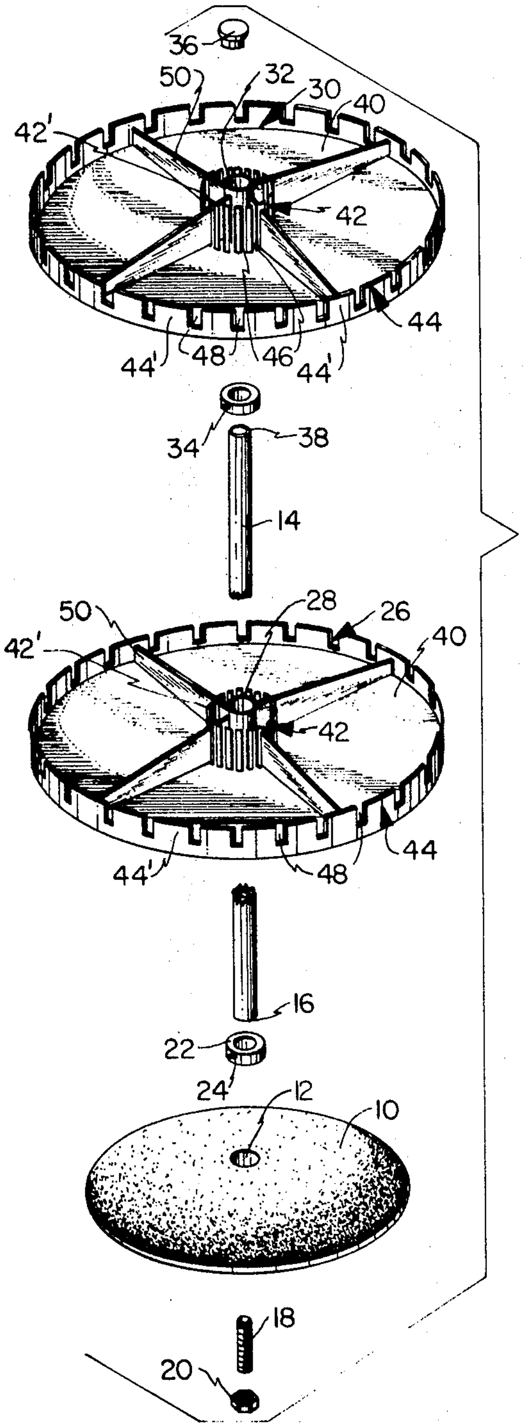
FIG. 1 depicts an exploded perspective view of the inventive revolving storage table.

Referring now to the drawings, and particularly to FIG. 1 thereof, an exploded view illustrating the component parts of the novel revolving storage table can be seen. A base member generally designated 10 and preferably constructed of metal or another heavy material is provided for support of the inventive device. A through-bore 12 extends through the center portion of the base member. An elongated, hollow pole 14 is contemplated to extend vertically upward from the base member 10, the lower end 16 of the pole 14 being internally threaded. A threaded nipple 18 having a nut 20 thereon extends upwardly through the bore 12 in the base member 10 and is threaded into pole 14 to secure pole 14 a vertical position.

A first collar means 22 is then placed over the elongated pole 14 and slid down to the bottom thereof immediately adjacent the base member 10. Collar means 22 preferably comprises a nylon ring and is provided with a casehardened metal setscrew 24 to securely hold the collar means in position on the pole 14.

A first tray means generally designated 26 is slid down the elongated pole 14 into contact with collar means 22 adjacent the base. Tray means 26 is provided with a centrally disposed journaling bore 28 therethrough and is adapted to be removably journaled for rotation on pole 14 and supported in position by the collar means 22. The nylon construction of the collar means greatly facilitates rotation of the tray.

A second tray means 30 including a centrally disposed journaling bore 32 therethrough is also adapted to be removably journaled for rotation on pole 14 at a selected distance above the first tray means 26. A second collar means 34, similar in construction to collar means 22, is disposed on pole 14 immediately beneath the second tray means 30 for supporting the second tray means at the selected distance above the first tray means 26 and the base 10. In the preferred inventive embodiment, collar means 34 is disposed 1⅞ inches from the top portion 38 of pole 14.

To complete the inventive construction, a plug 36 is provided and is adapted to be placed into the top portion 38 of the pole 14 to provide a smooth surface area.

Figure 2:
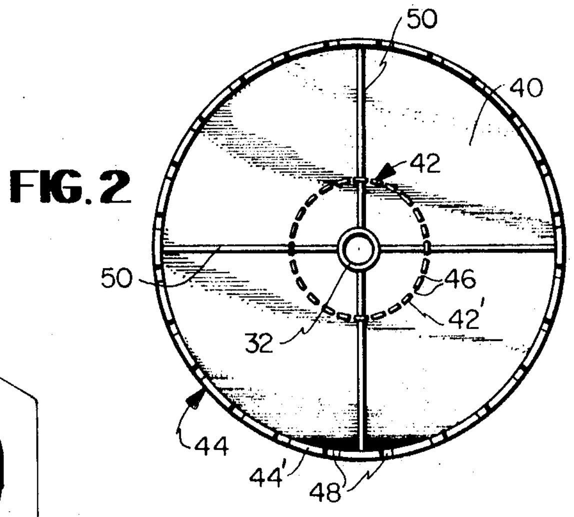
FIG. 2 is a top plan view of an individual tray or disc of the revolving storage table.
Figure 6:
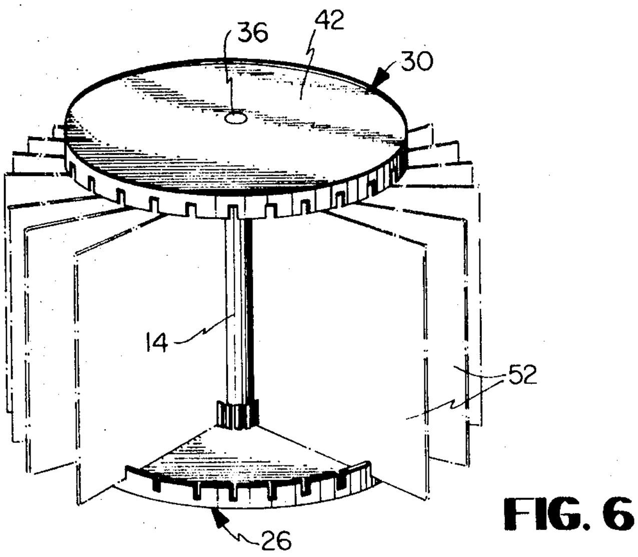

Referring now to FIG. 2 as well as to FIG. 1, the detailed construction of the tray means of the instant invention will be apparent. Both the first and second tray means 26 and 30, respectively, are contemplated to comprise substantially identical first and second discs. Each disc comprises centrally disposed journaling bore 28 and 32, respectively, preferably having an axial length 29 of 1⅞ inches, the significance of which will become apparent. Each disc defines a generally planar top surface 40 as well as a generally planar bottom surface 42 (see FIG. 6). The top surface 40 of each of the discs include ring-shaped guide means 42 and 44 which are concentrically disposed on and extend generally normal to the top surface 40 at different radial distances about the journaling bore 28 and 32 respectively.

Guide means 42 and 44 comprise first and second pluralities of spaced-apart extending fingers 42' and 44', respectively defining first and second concentric rings. As will be noted, the second concentric ring comprising extending fingers 44' is disposed at a greater radial distance from the journaling bore 28 and 32 of each disc than is the first ring comprising fingers 42'. Additionally, it should be noted that the spaces between each adjacent finger 42' 44 ' of the respective rings define slots 46 and 48, respectively. For purposes that will become apparent as the description proceeds, it should be noted that each slot 46 of the first ring is radially aligned with a corresponding slot 48 of the second ring and, it should be further noted that the second ring is itself preferably disposed about the periphery of the respective disc and, in effect, defines a depending, slotted skirt portion.

Each of the tray means or discs 26 and 30 are preferably constructed of precision-molded, high-impact plastic material so as to impart the properties of high strength, relatively light weight and easy manufacture. To ensure rigidity of each tray or disc, a plurality of ribs 50 are molded into the upper surfaces.

Figure 3:
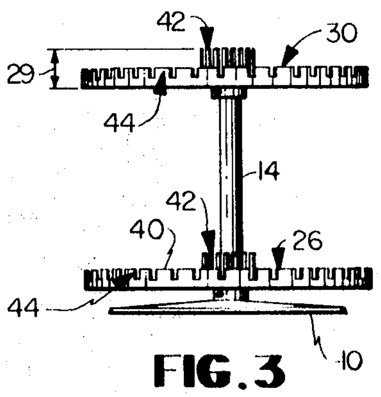
FIG. 3 is a side elevational view of the revolving storage table depicting the top tray or disc in position so as to accept a second tier of records.
Figure 4:
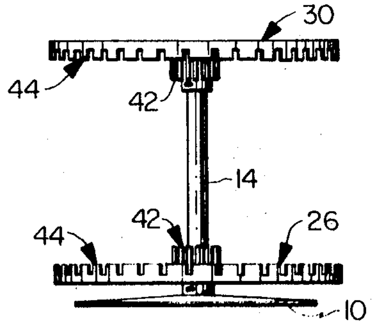
FIG. 4 is a side elevational view of the novel revolving storage table depicting the top tray in a position such that an occasional table is effected.
Figure 5:
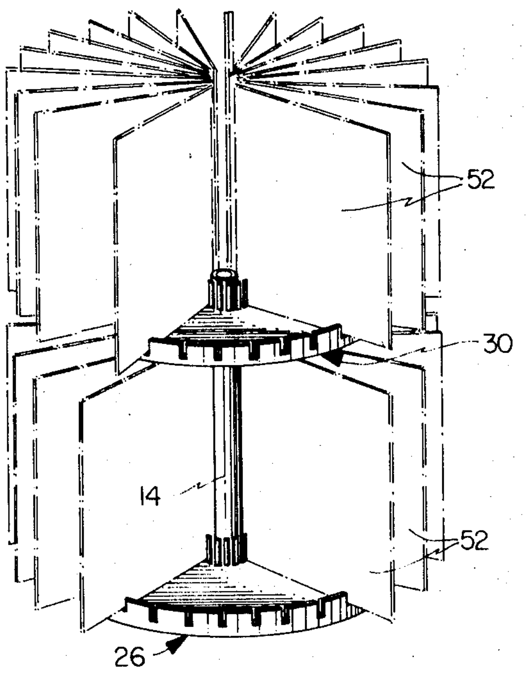
FIG. 5 is a perspective illustration of the novel revolving storage table in use as a double-tier record storage device; and, FIG. 6 is a perspective illustration of the novel revolving storage table in use as a combination single-tier record storage device and occasional table.

Referring now to FIGS. 3 and 4, two alternative assembled constructions of the inventive device are disclosed. In FIG. 3, the second tray means or disc is disposed on pole 14 such that the top surface 40 of the first disc or tray means 26 faces the bottom surface 42 of the second tray means or disc 30. In this manner, and referring now specifically to FIG. 5, the inventive apparatus comprises a double-tier record storage means, a plurality of records 52 being placed on each of the tray means 26 and 30, each record being maintained in a vertical position by the radially aligned slots 46 and 48 of the first and second rings of the guide means 42 and 44, respectively. In the preferred construction of the tray means, 24 radially aligned slot pairs 46 and 48 are provided. Thus, with the preferred inventive construction, 48 record albums can be stored in each of the storage tiers by merely placing two records in back-to-back relationship in each of the 24 slot pairs of each tier.

Of particular importance to the instant invention is the fact that when the records are placed in the various slot pairs in back-to-back relationship, the face of each record album is easily visible as the records are disposed in an outwardly extending fanlike arrangement. As will be appreciated, this disposition of the records is in contrast to prior art constructions wherein the records were generally maintained in a vertical stack between wide dividers. This particular advantageous feature of the instant invention directly inures from the construction of the novel guide means in that each slot of the first ring is radially aligned with a corresponding slot of the second ring, as discussed above.

If desired, the user of the inventive apparatus could merely slide the second or upper tray means 30 off the vertical extending pole 14 from the position shown in FIG. 3 and replace the second tray means 30 on the pole 14 in the position shown in FIG. 4 such that the top surface 40 of each of the tray means or discs 26 and 30 face one another. In this manner, and referring now specifically to FIG. 6, records 52 may be stored in the first or bottom tray 26, whereas the second or upper tray 30 now would present a flat, smooth surface coextensive with the top of the elongated pole 14 and the plug 36 thereof and thus provide an occasional table. This is the case since the axial length of the journaling bore 32 of the upper tray 30 is equal to the distance that collar means 34 is disposed from the top portion of hole 14, such distance preferably being 1⅞ inches as discussed above.

By virtue of the rotatable journaling of each of the first and second tray means upon the vertical pole and the provision of the nylon collar means or support bearings, either one of the tray means can easily be rotated thus facilitating selection of records and further affording the occasional table construction the so-called "lazy susan" characteristics.

As should now be apparent, the objects initially set forth at the outset of this specification have now been successfully achieved. Accordingly,

What is claimed is:

1. A revolving multitier combination record storage table and occasional table comprising:

a base member;

an elongated pole extending vertically upward of said base member;

first and second tray means respectively comprising first and second substantially identical discs, each disc incorporating generally planar top and bottom surfaces with the top surface defining an occasional table and with the bottom surface defining a record storage table, each disc having a centrally disposed journaling bore therethrough of predetermined axial length, said first and second tray means being removably and reversibly journaled for rotation on said pole with said second tray means being journaled at a selected distance above said first tray means;

collar means adjustably disposed on said pole immediately beneath said first second tray means for supporting said first and second tray means at adjustable locations on said pole and for providing a bearing surface, with said collar means for said second tray means being disposed on said pole at a distance from the top of the pole that is equal to said predetermined axial length;

and wherein each of the said discs includes ring-shaped guide means concentrically disposed on and extending generally normal to said top surface of each disc at different radial distances about said journaling bore, said guide means comprising first and second pluralities of spaced-apart extending fingers, said pluralities of fingers respectively defining a first and second concentric ring, said second ring being disposed at a greater radial distance from said journaling bore than said first ring, with the spaces between each adjacent finger of said respective rings defining slots into which phonograph records can be placed, each slot of said first ring being radially aligned with a corresponding slot of said second ring, and with the normal extension of said fingers of said first ring being greater than the normal extension of said fingers of said second ring.

2. A table as defined in claim 1, wherein said collar means comprise nylon rings.

3. A table as defined in claim 2, wherein said second concentric ring of fingers is disposed about the periphery of said disc and defines a depending, slotted skirt portion.

4. A table as defined in claim 1, wherein said first and second tray means are disposed on said pole such that the top surface of each of said discs face one another.

5. A table as defined in claim 1, wherein said first and second tray means are disposed on said pole such that the top surface of said first disc faces the bottom surface of said second disc.